United States Patent
Yamashita (10) Patent No.: US 11,609,719 B2
(45) Date of Patent: Mar. 21, 2023

(54) INSPECTION SYSTEM, STORAGE MEDIUM STORING INSPECTION PROGRAM, AND INSPECTION METHOD

(71) Applicant: KONICA MINOLTA, INC., Tokyo (JP)

(72) Inventor: Takashi Yamashita, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/896,520

(22) Filed: Jun. 9, 2020

(65) Prior Publication Data

US 2020/0401355 A1 Dec. 24, 2020

(30) Foreign Application Priority Data

Jun. 18, 2019 (JP) .............................. JP2019-112604

(51) Int. Cl.
*G06F 15/00* (2006.01)
*G06F 3/12* (2006.01)

(52) U.S. Cl.
CPC .......... *G06F 3/1205* (2013.01); *G06F 3/1208* (2013.01); *G06F 3/1253* (2013.01); *G06F 3/1259* (2013.01)

(58) Field of Classification Search
CPC .... G06F 3/1205; G06F 3/1208; G06F 3/1253; G06F 3/1259

USPC ....................................................... 358/1.18
See application file for complete search history.

(56) References Cited

U.S. PATENT DOCUMENTS

2011/0164290 A1* 7/2011 Nishikawa ......... H04N 1/00909
358/461
2018/0262627 A1* 9/2018 Iwase ................. H04N 1/00822

FOREIGN PATENT DOCUMENTS

JP 2018088620 A 6/2018

* cited by examiner

*Primary Examiner* — Mark R Milia
(74) *Attorney, Agent, or Firm* — Buchanan Ingersoll & Rooney PC (57) ABSTRACT

An inspection system according to the present invention includes: an abnormality detector that performs automatic inspection for detecting an abnormality on the basis of a read image obtained by causing a reader to read an image that is formed on a recording medium by executing a print job; and a hardware processor that, when the abnormality is detected in the automatic inspection, causes the reader to perform specific shading operation involving cleaning the reader after stopping the print job but before restarting the print job, wherein the specific shading operation is performed in a shorter time than normal shading operation involving cleaning the reader, the normal shading operation being performed except when the abnormality is detected in the automatic inspection.

10 Claims, 7 Drawing Sheets

INSPECTION SYSTEM, STORAGE MEDIUM STORING INSPECTION PROGRAM, AND INSPECTION METHOD

CROSS-REFERENCE TO RELATED APPLICATION

Japanese patent application No. 2019-112604 filed on Jun. 18, 2019, including description, claims, drawings, and abstract the entire disclosure is incorporated herein by reference in its entirety.

BACKGROUND

1. Technological Field

The present invention relates to an inspection system, a storage medium storing an inspection program, and an inspection method.

2. Description of the Related Art

An image forming apparatus has an automatic inspection function of, after an image is formed on a sheet, comparing a read image generated by reading the formed image with a reference image that is a reference for inspection as a normal image, thereby detecting an abnormal printed matter as a waste sheet. The abnormal printed matter having dots, streaks, dirt, misalignment, or the like detected by the automatic inspection function can be excluded by being separated from a non-defective printed matter by a purge function.

Unexamined Japanese Patent Publication No. 2018-088620 discloses the following technology as a prior art related to the automatic inspection function. In a case where a predetermined abnormality is detected in a read image obtained by causing an image reader provided in a conveyance path on the downstream side of an image former to read an image on a sheet, processing of removing the abnormality is performed in the image reader, and then an image on the next sheet is read by the image reader to determine whether or not the predetermined abnormality exists in the read image. In a case where it is determined that there is no abnormality, it is determined that the previous sheet in which the abnormality has been detected is not a waste sheet. This makes it possible to prevent productivity of printed matters from being decreased due to erroneous detection of waste sheets.

SUMMARY

Shading operation for stabilizing an amount of light, which involves cleaning the image reading apparatus, is performed at the time of starting an image reading apparatus or the like, before the start of a print job, at the time of opening and closing a door of a housing of the image reading apparatus, for example. The shading operation can also be performed when an abnormality is detected in automatic inspection. However, in a case where, when an abnormality is detected in the automatic inspection, the shading operation is performed in the same manner as the shading operation performed at the time other than detecting an abnormality in automatic inspection, a problem of a decrease in productivity arises. Meanwhile, the above prior art cannot solve such a problem.

The present invention has been made to solve such a problem. That is, an object of the present invention is to provide an inspection system, a storage medium storing an inspection program, and an inspection method, each of which is capable of preventing productivity from being decreased due to shading operation performed at the time of detecting an abnormality in automatic inspection.

To achieve at least one of the abovementioned objects, according to an aspect of the present invention, an inspection system, a storage medium storing an inspection program, and an inspection method, reflecting one aspect of the present invention comprises followings.

A inspection system comprising an abnormality detector that performs automatic inspection for detecting an abnormality on the basis of a read image obtained by causing a reader to read an image that is formed on a recording medium by executing a print job, and a hardware processor that, when the abnormality is detected in said automatic inspection, causes said reader to perform specific shading operation involving cleaning said reader after stopping said print job but before restarting said print job, wherein said specific shading operation is performed in a shorter time than normal shading operation involving cleaning said reader, said normal shading operation being performed except when the abnormality is detected in said automatic inspection.

A non-transitory computer-readable storage medium storing an inspection program, the inspection program causing a computer to execute (a) performing automatic inspection for detecting an abnormality on the basis of a read image obtained by causing a reader to read an image that is formed on a recording medium by executing a print job, and (b) when the abnormality is detected in said automatic inspection, causing said reader to perform specific shading operation involving cleaning said reader after stopping said print job but before restarting said print job, wherein said specific shading operation is performed in a shorter time than normal shading operation involving cleaning said reader, said normal shading operation being performed except when the abnormality is detected in said automatic inspection.

An inspection method executed by an inspection system, the method comprising (a) performing automatic inspection for detecting an abnormality on the basis of a read image obtained by causing a reader to read an image that is formed on a recording medium by executing a print job, and (b) when the abnormality is detected in said automatic inspection, causing said reader to perform specific shading operation involving cleaning said reader after stopping said print job but before restarting said print job, wherein said specific shading operation is performed in a shorter time than normal shading operation involving cleaning said reader, said normal shading operation being performed except when the abnormality is detected in said automatic inspection.

The objects, features, and characteristics of this invention other than those set forth above will become apparent from the description given herein below with reference to preferred embodiments illustrated in the accompanying drawings.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Hereinafter, an embodiment of the present invention will be described with reference to the accompanying drawings. Note that, in the description of the drawings, the same elements will be denoted by the same reference signs, without redundant description. Further, dimensional ratios in the drawings may be exaggerated for convenience of description, and may be different from actual ratios.

Figure 1:
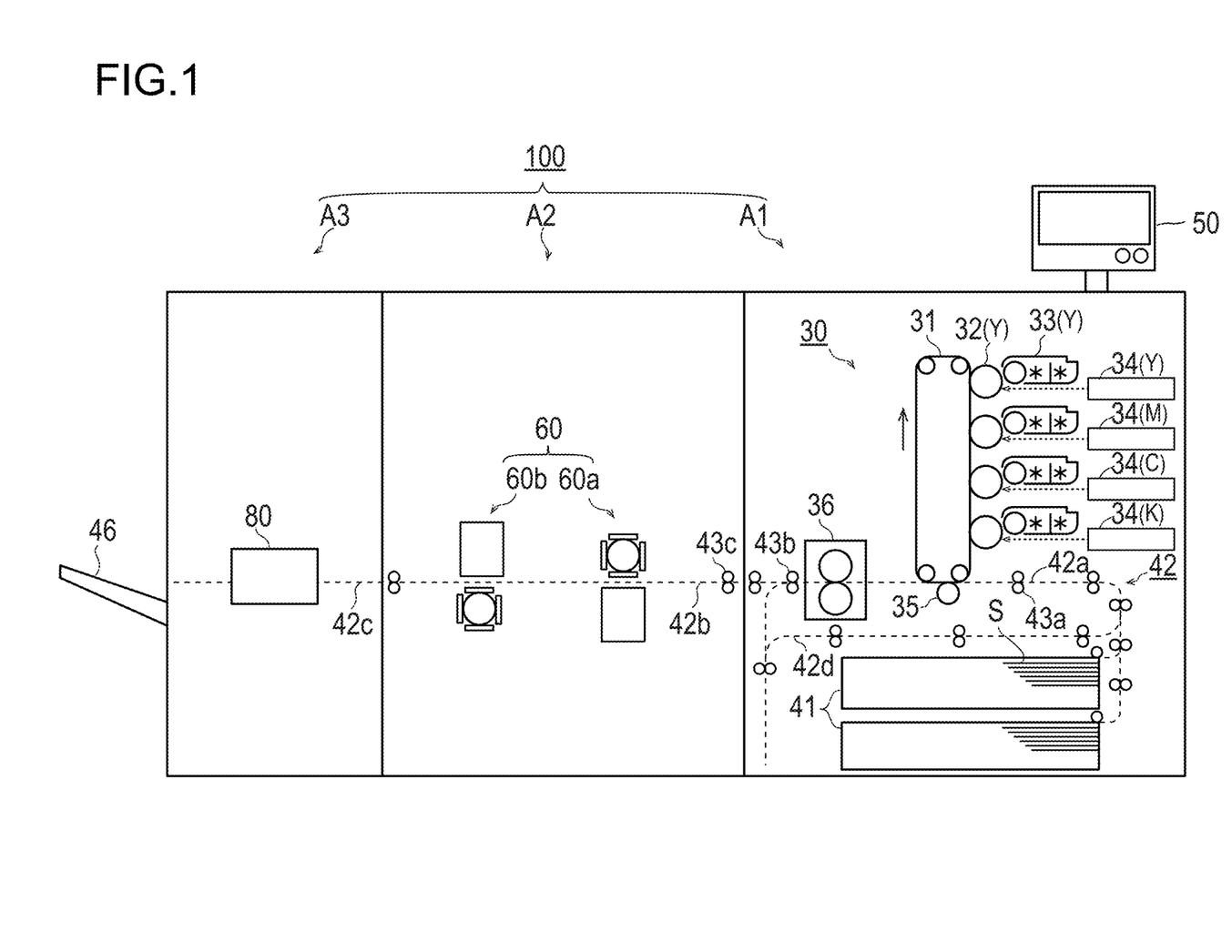
FIG. 1 is a diagram illustrating a schematic configuration of an image forming system.
Figure 2:
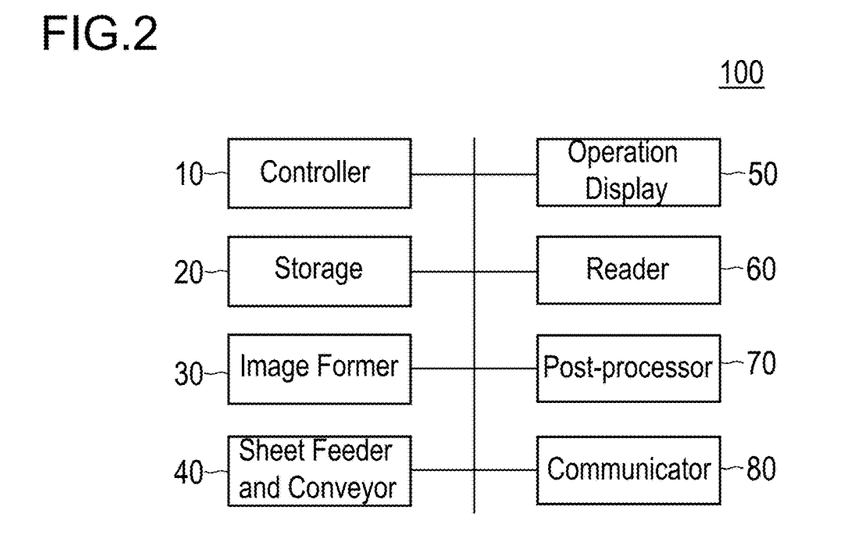
FIG. 2 is a block diagram illustrating a configuration of the image forming system.
Figure 3:
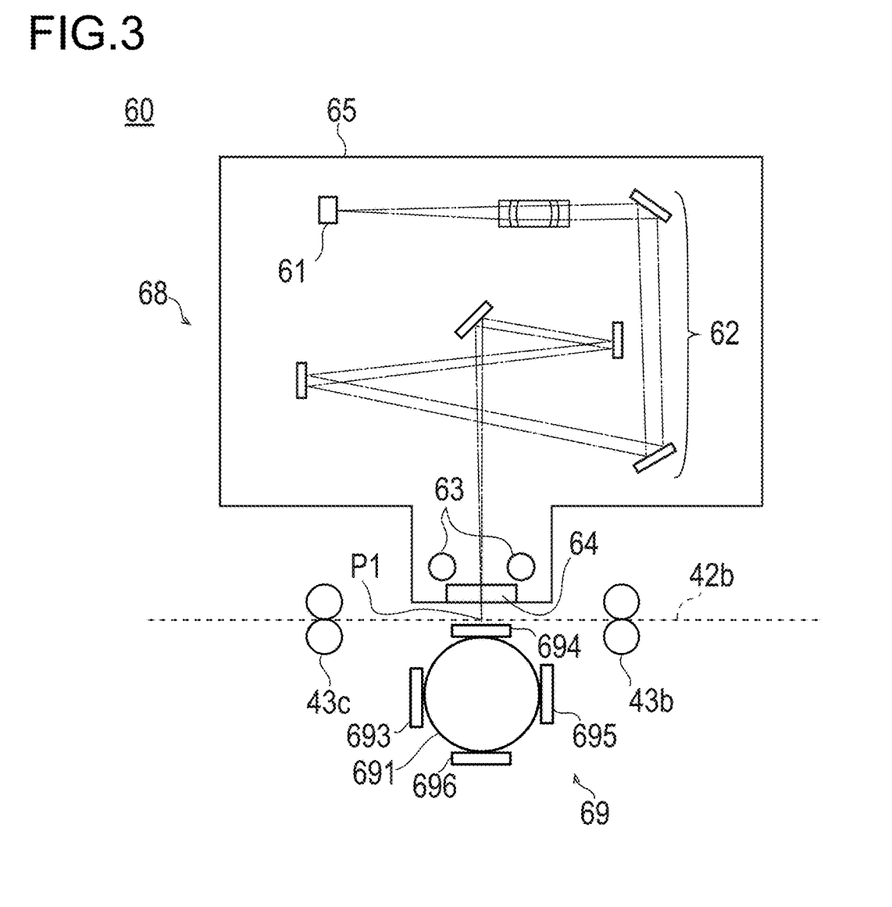
FIG. 3 is a diagram illustrating a schematic configuration of a reader.

FIG. 1 is a diagram illustrating a schematic configuration of an image forming system 100. FIG. 2 is a block diagram illustrating a configuration of the image forming system 100. FIG. 3 is a diagram illustrating a schematic configuration of a reader 60.

The image forming system 100 includes an image forming apparatus A1, a first post-processing apparatus A2 including the reader 60, and a second post-processing apparatus A3 including a post-processor 70 that performs a stapling process. The image forming system 100 forms an inspection system.

As illustrated in FIG. 2, the image forming system 100 includes a controller 10, a storage 20, an image former 30, a sheet feeder and conveyor 40, an operation display 50, the reader 60, the post-processor 70, and a communicator 80, and those members are interconnected via a bus for exchanging signals. The controller 10 forms an abnormality detector, and also forms an acceptor together with the operation display 50.

The controller 10 is a CPU, and controls each unit of the apparatuses and performs various kinds of arithmetic processing according to programs. An operation of the controller 10 will be described later.

The storage 20 includes a ROM that stores various programs and various kinds of data in advance, a RAM that temporarily stores programs and data as a work area, a hard disk that stores various programs and various kinds of data, and the like.

The image former 30 includes an intermediate transfer belt 31, photosensitive drums 32, developers 33, writers 34, a secondary transfer unit 35, and a fixer 36. The photosensitive drums 32, the developers 33, and the writers 34 are provided corresponding to yellow (Y), magenta (M), cyan (C), and black (K), respectively. However, regarding those members, signs other than Y are omitted in FIG. 1.

Each writer 34 of the image former 30 exposes a charged surface of the photosensitive drum 32 to form an electrostatic latent image on the basis of image data. The developer 33 develops the formed electrostatic latent image with toner of the developer 33 to form a toner image of each color on the surface of each photosensitive drum 32. Those toner images are successively superimposed on the intermediate transfer belt 31 by primary transfer units (not illustrated) of respective colors, and thus a full-color toner image is formed. This toner image is transferred onto a sheet S by the secondary transfer unit 35, and is then subjected to a heating and pressing process in the fixer 36. Thus, a full-color image is formed on the sheet S.

The sheet feeder and conveyor 40 includes a sheet feed tray 41, conveyance paths 42 (42a to 42d), a plurality of conveyance rollers 43 (43a to 43c), a drive motor (not illustrated) for driving the conveyance rollers 43, and a sheet discharge tray 46.

The sheet feeder and conveyor 40 rotates each of the conveyance rollers 43 by driving the drive motor, feeds the sheet S from the sheet feed tray 41, and conveys the sheet S through the conveyance paths 42.

The conveyance paths 42 include conveyance paths 42a and 42d in the image forming apparatus A1, a conveyance path 42c in the first post-processing apparatus A2, and a conveyance path 42c in the second post-processing apparatus A3.

The sheet S fed from the sheet feed tray 41 is conveyed through the conveyance path 42a. The resist rollers 43a that are rotated and stopped by a clutch to adjust a sheet conveyance timing are arranged on the conveyance path 42a.

The sheet S, which has been conveyed through the conveyance path 42a and has been subjected to image formation by the image former 30, passes through the downstream conveyance paths 42b and 42c, and is subjected to each process according to a print setting of a print job. Thereafter, the sheet S is discharged to the outside of the apparatus and is placed on the sheet discharge tray 46.

In a case where the print setting of the print job is a setting for duplex printing, the sheet S on which an image has been formed on one side is conveyed through the ADU conveyance path 42d arranged in a lower part of the image forming apparatus A1. The sheet S conveyed through the ADU conveyance path 42d is turned upside down through a switchback path, then meets the conveyance path 42a, and is subjected to image formation by the image former 30 again.

The operation display 50 includes a touchscreen, a numeric keypad, a start button, a stop button, and the like, and is used for inputting various settings, displaying a state of the apparatuses, and inputting various instructions.

The reader 60 is arranged on the conveyance path 42b, and reads the images formed on front and back surfaces of the sheet S conveyed from the upstream conveyance path 42a, thereby generating a read image (hereinafter, also simply referred to as "the read image"). In the example of FIG. 3, the reader 60 includes a scanner 68 for reading the image on the front surface of the sheet S and a calibrator 69 for reading the image on the back surface of the sheet S.

The scanner 68 includes a sensor array 61, an optical system 62, LED (Light Emitting Diode) light sources 63, a platen glass 64, and a housing 65 that houses those members. The sensor array 61 includes a plurality of optical elements (e.g., CCDs (Charge Coupled Devices)) arranged in a line along a main scanning direction, and is a color line sensor capable of reading the entire width range in a width direction of the sheet S. The optical system 62 includes a plurality of mirrors and lenses. Light from the LED light sources 63 is transmitted through the platen glass 64 to irradiate the surface of the sheet S passing through a reading position P1. The image at the reading position P1 is guided by the optical system 62 and is formed on the sensor array 61. The platen glass 64 faces the conveyance path 42b and prevents inside of the housing 65 from being dirty.

Figure 4:
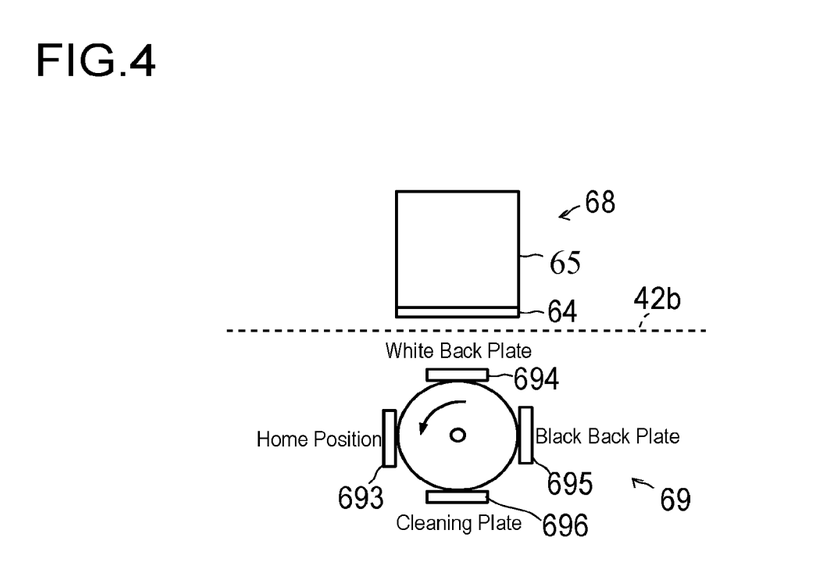
FIG. 4 is a diagram illustrating a schematic configuration of a calibrator.

FIG. 4 is a diagram illustrating a schematic configuration of the calibrator 69. FIG. 4 also illustrates the scanner 68.

The calibrator 69 includes a rotating body 691, a rotating shaft 692, a home position (plate) 693, a white back plate 694, a black back plate 695, and a cleaning plate 696. The home position 693, the white back plate 694, the black back plate 695, and the cleaning plate 696 are provided on an outer peripheral surface of the rotating body 691. The rotating body 691 is rotatable about a rotating shaft 692 by a drive motor (not illustrated), and is rotated by a predetermined angle to move a surface of each plate so that the surface faces the platen glass 64 at the reading position P1.

The read image can be compared with a reference image that is a reference for inspection as a normal image. Thus, automatic inspection for detecting a printed matter in which an abnormality has been detected in the read image as a waste sheet is performed. In the automatic inspection, abnormalities such as dots, streaks, dirt, and displacement are detected. Hereinafter, detection of the abnormality (waste sheet) in the automatic inspection will also be simply referred to as "abnormality detection". The reference image may be the read image of the printed matter determined to be a non-defective printed matter as a result of visual inspection by a user, or image data included in the print job may be used as the reference image.

The automatic inspection is generally performed in a state where the white back plate 694 is arranged at the reading position P1. In a case where it is necessary to detect edges of the conveyed sheet S for sheet alignment or other purposes, the black back plate 695 is arranged at the reading position P1. During standby, the home position 693 is arranged at the reading position P1. Further, when the rotating body 691 is rotated, the cleaning plate 696 cleans dirt adhering to a surface of the platen glass 64 with which the cleaning plate 696 is brought into contact when the cleaning plate 696 passes through the platen glass 64 while facing the platen glass 64. The cleaning plate 696 can include, for example, a plate on which a cleaning brush is planted.

The reader 60 performs shading operation for stabilizing an amount of light, which compensates for density unevenness between the optical elements caused by unevenness of the LED light sources 63, variation in sensitivity of the optical elements, or the like. Specifically, in the shading operation, a correction value for compensating for sensitivity unevenness between pixels is generated from image signals from the optical elements obtained by reading both the white back plate 694 and the black back plate 695 respectively, and amounts of light of the LED light sources 63 are corrected on the basis of the correction value. Because the rotating body 691 is rotated in the shading operation, the platen glass 64 is cleaned by the cleaning plate 696. Therefore, the shading operation involves cleaning the reader 60. Further, the shading operation involves detecting an abnormality (detecting a level of an abnormality) performed when the white back plate 694 and the like are read. Therefore, the shading operation includes stabilizing the amounts of light, detecting the abnormality, and cleaning the reader 60.

The shading operation can be performed when the reader 60 is started up, before the print job is started, when a door of the housing 65 of the reader 60 is opened and closed, and when the abnormality is detected in the automatic inspection. As described later, shading operation (specific shading operation described later), which is performed in a shorter time than shading operation performed at the time other than abnormality detection (hereinafter, also referred to as "normal shading operation"), can be performed at the time of abnormality detection according to a mode selected by the user.

The post-processor 70 is provided on the conveyance path 42c. The post-processor 70 includes a stacking unit for stacking sheets and a stapling unit, and stacks a plurality of sheets S in the stacking unit, and then performs a side stitching process using staples in the stapling unit. A bundle of side-stitched sheets S is discharged onto the sheet discharge tray 46. The sheet S that is not to be side stitched is discharged as it is through the conveyance path 42c.

The communicator 80 can be various local connection interfaces such as network interfaces based on standards such as SATA, PCI Expres, USB, Ethernet (registered trademark), and IEEE1394, and wireless communication interfaces such as Bluetooth (registered trademark) and IEEE802.11. The print job including the print data and the print setting is received from an external terminal such as a PC through a communication interface 90.

An operation of the controller 10 will be described.

Figure 5:
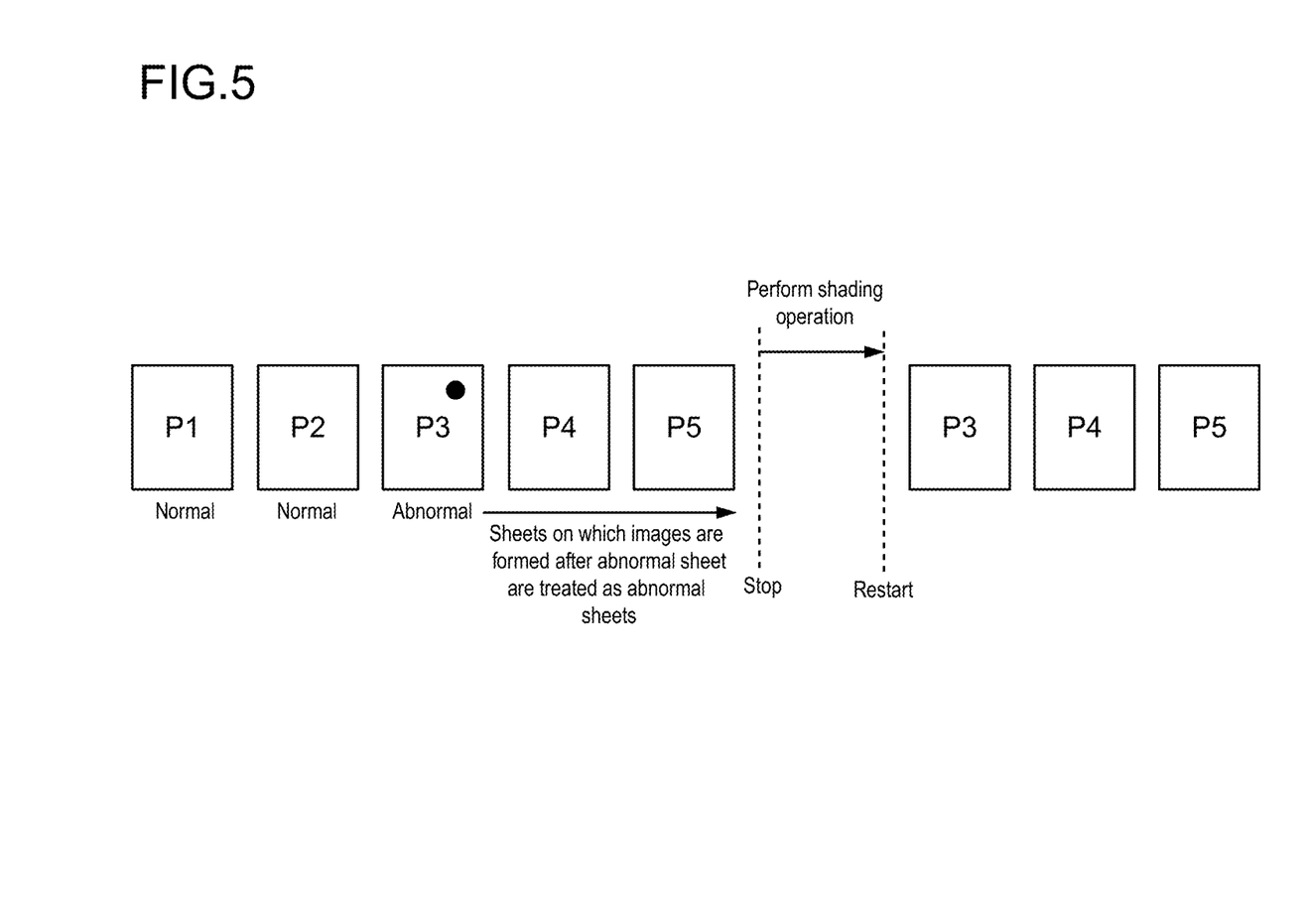
FIG. 5 is a diagram illustrating an example of recovery operation of a waste sheet performed when an abnormality is detected in automatic inspection.

FIG. 5 is a diagram illustrating an example of a recovery operation of the waste sheet performed when the abnormality is detected in the automatic inspection.

Each rectangle illustrated in FIG. 5 indicates the read image of each sheet S on which the image has been formed by executing the print job. The number added to P indicates the order in which the images have been formed by executing the print job. For example, P1 indicates the first sheet S of the printed matter, and P3 indicates the third sheet S of the printed matter. In the example of FIG. 5, the abnormality is detected such that a dot is detected as indicated by a black circle on the third sheet S in the automatic inspection. In this case, among the (first to fifth) sheets S on which images have already been formed, the (first and second) sheets S before the third sheet are normal in the automatic inspection, and are therefore discharged to the sheet discharge tray 46 as non-defective products. Meanwhile, the third and subsequent sheets S (third to fifth sheets) are treated as the abnormal sheets (waste sheets) in the automatic inspection and are output to a purge tray (not illustrated). Thus, those sheets S can be excluded from the printed matter serving as the product.

When the abnormality is detected in the automatic inspection, the controller 10 stops the image forming system 100 and stops execution of the print job. Thereafter, the controller 10 can perform the specific shading operation. The specific shading operation is shading operation performed in the shorter time than the normal shading operation performed at the time other than abnormality detection in the automatic inspection. After performing the specific shading operation, the controller 10 restarts operation of the image forming system 100 to restart the execution of the print job. The controller 10 forms again the images formed on the third to fifth sheets determined to be abnormal in the restarted print job. In a case where there are images to be formed on the sixth and subsequent sheets, those images are also formed. Thus, the printed matter determined to be waste sheets is recovered. Note that, in the restarted print job, images for all pages may be formed. Alternatively, only the images formed on the sheets S detected to be abnormal may be formed again.

Figure 6:
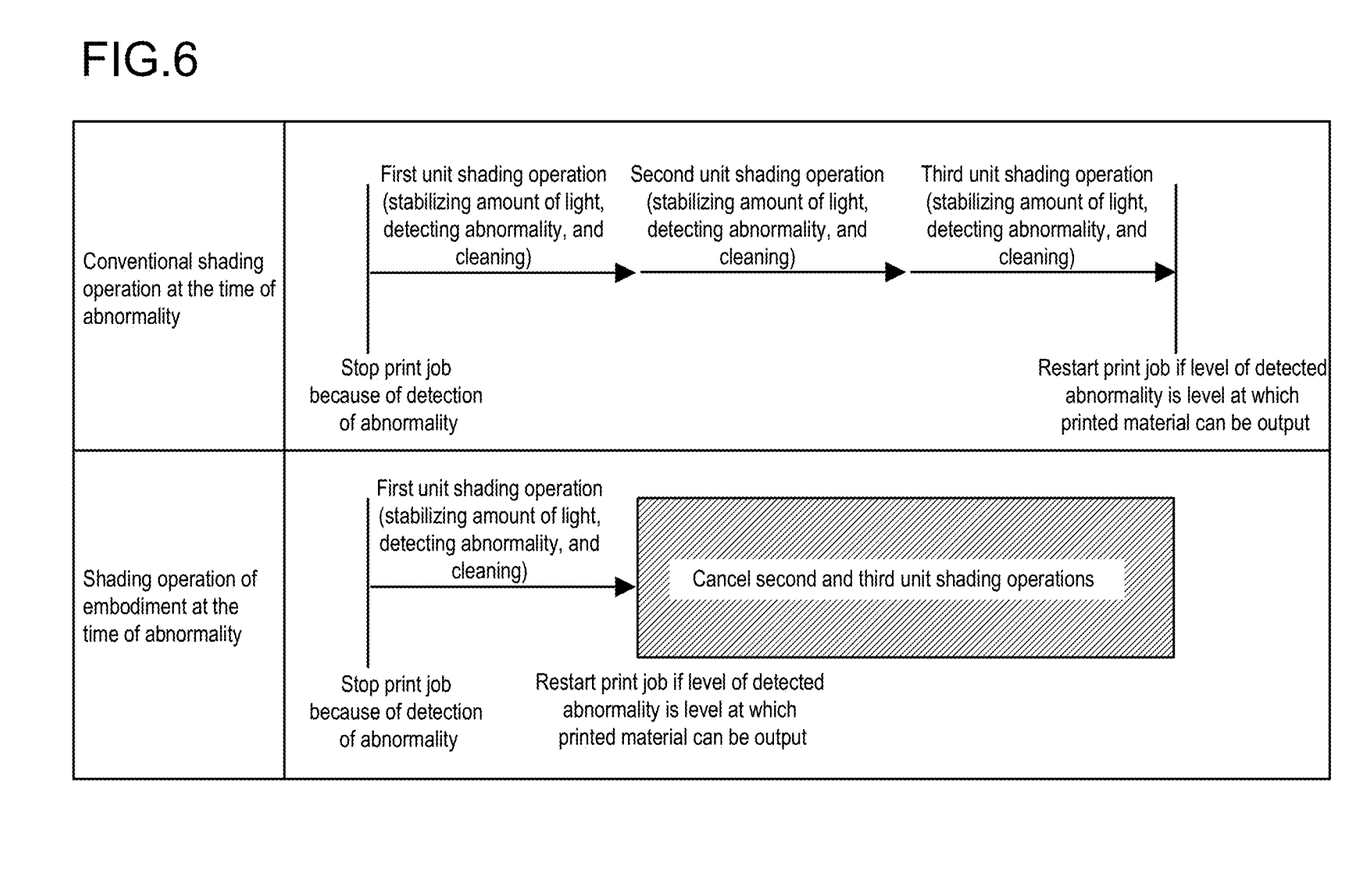
FIG. 6 is a diagram illustrating an example of specific shading operation in comparison with an example of conventional shading operation performed when an abnormality is detected.

FIG. 6 is a diagram illustrating an example of the specific shading operation in comparison with an example of conventional shading operation performed when an abnormality is detected.

As illustrated in FIG. 6, conventionally, a unit shading operation including an operation for stabilizing an amount of light, detecting an abnormality, and cleaning the reader 60 is performed three times as the shading operation performed at the time of abnormality detection. Note that the unit shading operation is also similarly performed three times in the shading operation performed at the time other than abnormality detection. Then, if a level of the abnormality detected in the last (third) unit shading operation is a level at which the printed matter can be output as the product, the print job is restarted and the recovery operation is performed.

Meanwhile, in the embodiment, the specific shading operation in which the unit shading operation is performed once is performed at the time of abnormality detection. For the shading operation performed at the time other than abnormality detection, the unit shading operation is performed three times. That is, as the shading operation at the time of abnormality detection, the specific shading operation can be performed in a shorter time than the normal shading operation. Then, if the level of an abnormality detected in the specific shading operation is a level at which the printed matter can be output as the product, the print job is restarted and the recovery operation is performed. The level at which the printed matter can be output as the product can be set in advance. The level at which the printed matter can be output as the product can be, for example, a level at which the printed matter is determined to be normal in the automatic inspection. The level at which the printed matter can be output as the product may be a relatively strict normality criterion set in the shading operation. Note that detection of the abnormality in the unit shading operation includes, for example, a size of dust (e.g., a size of the dot) and a degree of a streak (e.g., a width of the streak). The unit shading operation can be performed in a process of rotating the rotating body 691 of the reader 60 once (i.e., involves cleaning). The unit shading operation may be performed in the process of rotating the rotating body 691 of the reader 60 two or more times.

In the specific shading operation, as illustrated in the example of FIG. 6, only one of the three times of the unit shading operation included in the shading operation performed at the time other than abnormality detection may be performed. Alternatively, each unit shading operation may be performed in a shorter time than the shading operation performed at the time other than abnormality detection. That is, the specific shading operation may be any shading operation as long as the specific shading operation is performed in a shorter time than the shading operation performed at the time other than abnormality detection.

The controller 10 performs the specific shading operation at the time of abnormality detection according to a mode designated by the user. The mode is input by the user on the operation display 50, for example. The mode includes a first mode and a second mode. The first mode is a mode in which the shading operation performed at the time of abnormality detection in the automatic inspection is performed as the specific shading operation. The second mode is a mode in which the shading operation is started when the abnormality is detected, and, in a case where a level of an abnormality detected in the operation for stabilizing the amount of light in the started shading operation is lower than a level of an abnormality detected in the automatic inspection, the started shading operation is performed as the specific shading operation. Note that the level of the abnormality detected in the automatic inspection can be lower than the level of the abnormality detected in the shading operation.

An operation of the image forming system will be described.

Figure 7A:
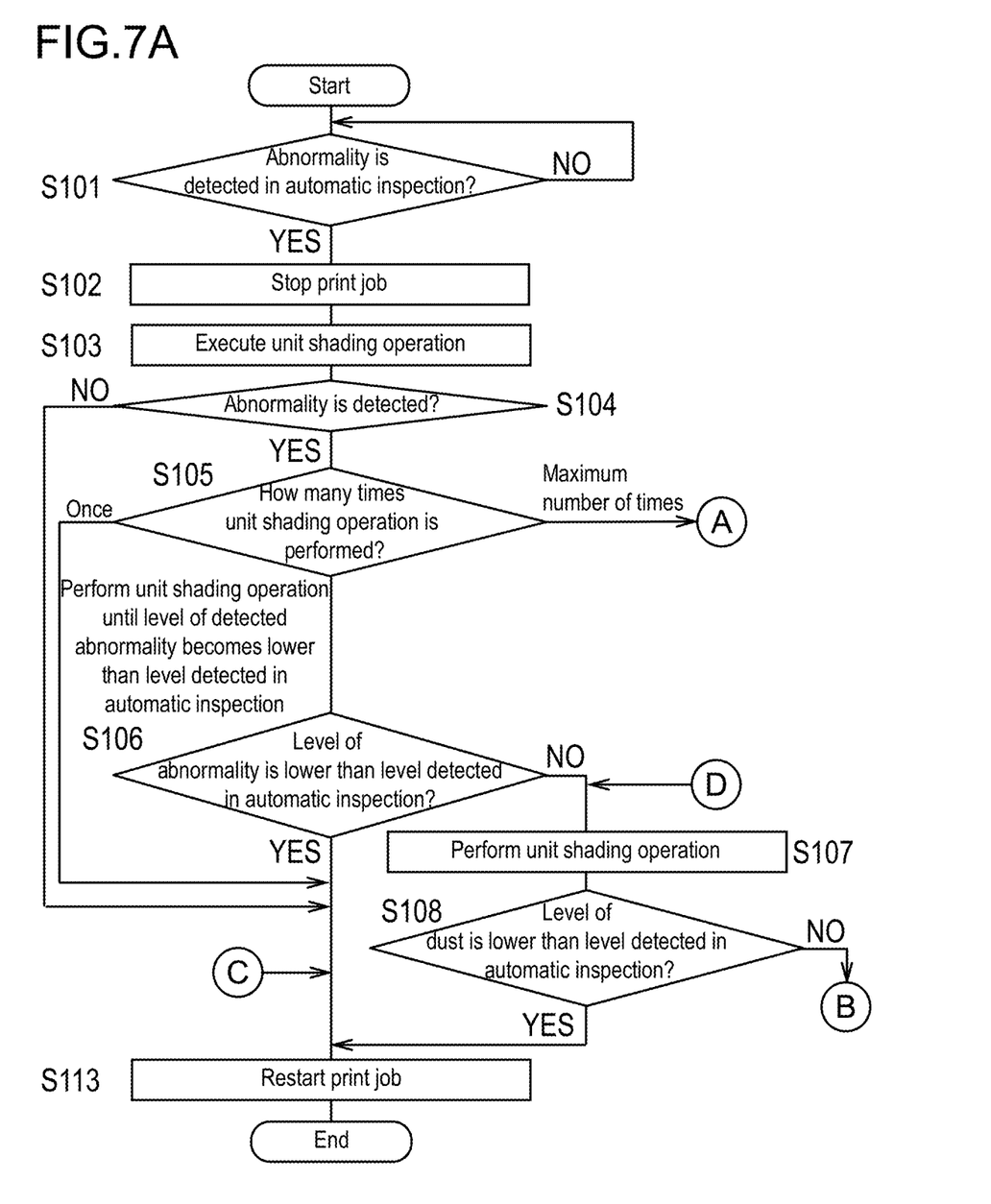
FIG. 7A is a flowchart showing operation of the image forming system.
Figure 7B:
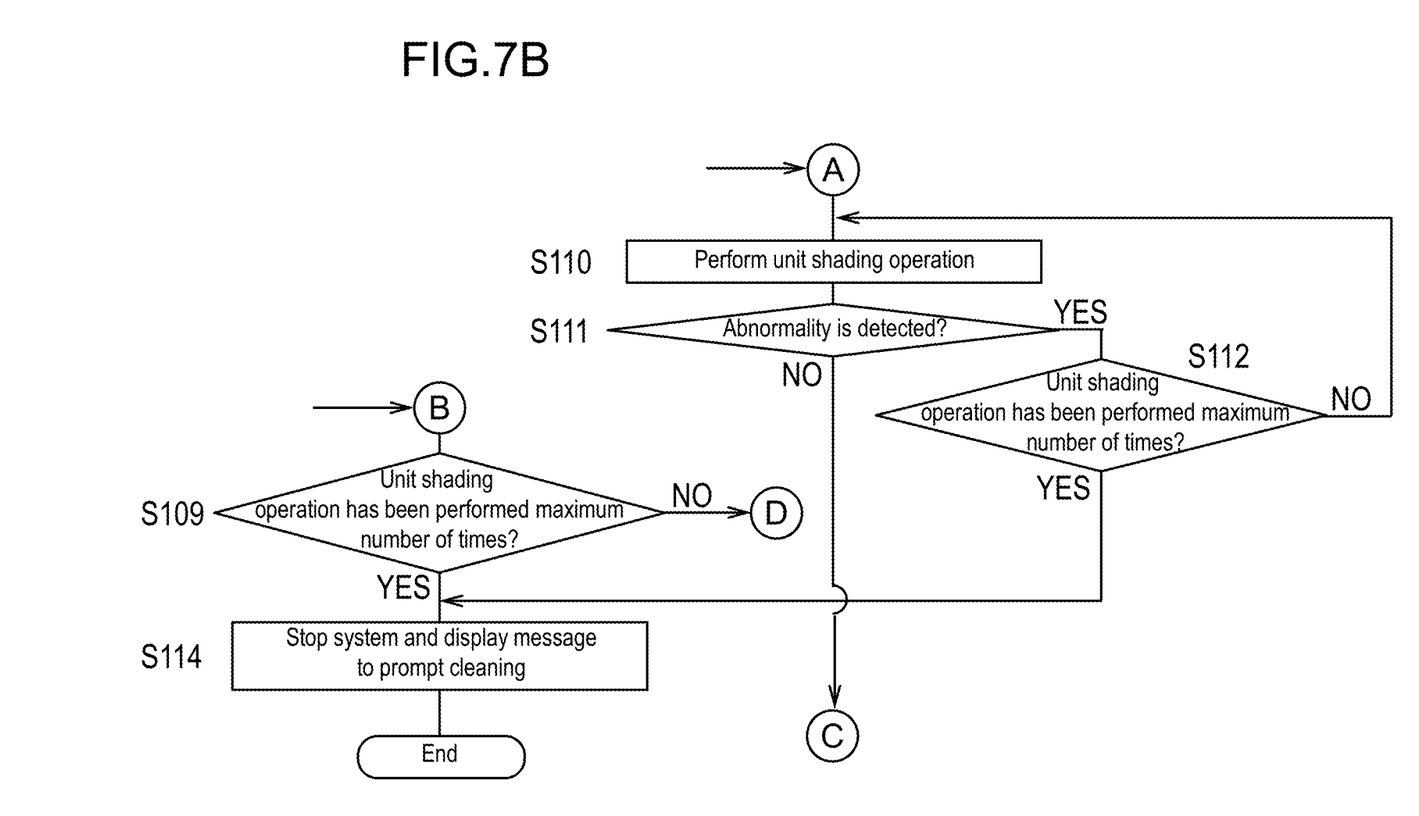
FIG. 7B is a flowchart showing operation of the image forming system.

FIGS. 7A and 7B are flowcharts showing operation of the image forming system 100. Those flowcharts can be executed by the controller 10 according to a program. Note that the unit shading operations performed in steps S103, S107, and S110 may be the same operation or different operations respectively. The different operations include, for example, a case where a rotation speed of the rotating body 691 in unit shading is different and a case where the number of rotations of the rotating body 691 is different. The unit shading operations performed in steps S103, S107, and S110 form partial shading operation respectively.

The controller 10 starts execution of the print job, and determines whether the abnormality is detected in the automatic inspection (S101). When determining that no abnormality is detected (S101: NO), the controller 10 repeatedly executes step S101.

When determining that the abnormality is detected (S101: YES), the controller 10 stops the print job and stops the image forming system 100 (S102). Thereafter, the controller 10 executes the unit shading operation (S103). That is, the controller 10 starts the shading operation.

When detecting no abnormality in the reader 60 in the unit shading operation (S104: NO), the controller 10 restarts operation of the image forming system 100 and restarts the print job (S113). In this case, the specific shading operation is performed by performing the unit shading operation only once.

When detecting the abnormality in the unit shading operation (S104: YES), the controller 10 checks the mode designated by the user (S105). Then, when the designated mode is the first mode, the specific shading operation in which the unit shading operation is performed once needs to be performed according to the designated mode. In this case, because the unit shading operation has already been performed once in step S103, the controller 10 restarts the print job (S113).

When the designated mode is the second mode, the controller 10 needs to perform the unit shading operation according to the designated mode until the level of the abnormality detected in the unit shading operation becomes lower than the level detected in the automatic inspection. Therefore, in this case, the controller 10 executes steps S106 to S109. The controller 10 determines whether the level of the abnormality is lower than the level detected in the automatic inspection (S106). When determining that the level of the abnormality is lower than the level detected in the automatic inspection (S106: YES), the controller 10 restarts the print job (S113). This is because even if the relatively strict normality criterion set in the shading operation is not satisfied, when the abnormality is at a level at which the abnormality is not detected in the automatic inspection, no problem arises even if, for example, a small amount of dust or the like adheres to the platen glass 64 of the reader 60. When determining that the level of the abnormality is not lower than the level detected in the automatic inspection (S106: NO), the controller 10 further performs the unit shading operation (S107). Then, the controller 10 determines whether the level of the abnormality is lower than the level detected in the automatic inspection (S108). When determining that the level of the abnormality is lower than the level detected in the automatic inspection (S108: YES), the controller 10 restarts the print job (S113). When determining that the level of the abnormality is not lower than the level detected in the automatic inspection (S108: YES), the controller 10 determines whether the unit shading operation has been performed the preset maximum number of times (S109). The preset maximum number of times may be, for example, the number of times of the unit shading operation included in the shading operation performed at the time other than abnormality detection. The preset maximum number of times can be, for example, three times. When determining that the unit shading operation has not been performed the preset maximum number of times (S109: NO), the controller 10 returns to step S107 and executes the processing. When determining that the unit shading operation has been performed the preset maximum number of times (S109: YES), the controller 10 stops the image forming system 100 and causes the operation display 50 to display a message to prompt cleaning the reader 60 (S114).

When determining in step S105 that the unit shading operation needs to be performed the preset maximum number of times because no mode is designated by the user or for other reasons, the controller 10 further performs the unit shading operation (S110). Then, when determining that no abnormality has been detected in the performed unit shading operation (S111: NO), the controller 10 restarts the print job (S113). When determining that the abnormality has been detected in the unit shading operation (S111: YES), the controller 10 determines whether the unit shading operation has been performed the preset maximum number of times (S112). When determining that the unit shading operation has not been performed the preset maximum number of times (S112: NO), the controller 10 returns to step S110 and executes the processing. When determining that the unit shading operation has been performed the preset maximum number of times (S112: YES), the controller 10 stops the image forming system 100 and causes the operation display 50 to display the message to prompt cleaning the reader 60 (S114).

The embodiment has the following effects.

At the time of abnormality detection in the automatic inspection, the shading operation involving cleaning the reader is performed in the shorter than the shading operation performed at the time other than abnormality detection in the automatic inspection. This makes it possible to prevent productivity from being decreased due to the shading operation performed when the abnormality is detected in the automatic inspection.

The shading operation involving cleaning the reader is started at the time of abnormality detection in the automatic inspection. Then, in the case where the level of the abnormality detected in the operation for stabilizing the amount of light in the started shading operation is lower than the level of an abnormality detected in the automatic inspection, the shading operation is performed as the specific shading operation that is performed in the shorter time than the shading operation performed at the time other than abnormality detection. This makes it possible to appropriately reduce a time period for the shading operation performed at the time of abnormality detection to such an extent that the time period does not affect inspection accuracy of the automatic inspection.

Further, in the specific shading operation, part of the plurality of partial shading operations included in the shading operation performed at the time other than abnormality detection is performed. This makes it possible that a time period for the shading operation at the time of abnormality detection is easily set to be shorter than a time period for the shading operation performed at the time other than abnormality detection.

Further, designation of either the first mode or the second mode is accepted from the user. The first mode is the mode in which the shading operation performed when the abnormality is detected in the automatic inspection is performed as the specific shading operation. The second mode is the mode in which the shading operation is started when the abnormality is detected, and, in the case where a level of an abnormality detected in the operation for stabilizing the amount of light in the started shading operation is lower than the level of the abnormality detected in the automatic inspection, the started shading operation is performed as the specific shading operation. This makes it possible to appropriately prevent productivity from being decreased due to the shading operation while improving convenience for the user.

The configurations of the inspection system, the inspection program, and the inspection method described above are main configurations for describing features of the above embodiment, are not limited to the above configurations, and can be variously modified within the scope of the claims. Further, the configurations do not exclude configurations provided in general inspection systems and the like.

For example, a recording medium on which the image is formed does not need to be the sheet. The recording medium includes a resin film, an envelope, and the like.

Further, means and a method for performing various processes in the inspection system according to the above embodiment can be realized by either a dedicated hardware circuit or a programmed computer. The above program may be provided by a computer-readable recording medium such as a USB memory or a DVD (Digital Versatile Disc)-ROM, or may be provided online via a network such as the Internet. In this case, the program recorded on the computer-readable recording medium is generally transferred to and stored in a storage such as a hard disk. Further, the program may be provided as independent application software, or may be incorporated as a function into software of an apparatus such as a detector thereof.

Although embodiments of the present invention have been described and illustrated in detail, the disclosed embodiments are made for purpose of illustration and example only and not limitation. The scope of the present invention should be interpreted by terms of the appended claims.

What is claimed is:

1. An inspection system comprising:
   an abnormality detector that performs automatic inspection for detecting an abnormality on the basis of a read image obtained by causing a reader to read an image that is formed on a recording medium by executing a print job; and
   a hardware processor that, when the abnormality is detected in said automatic inspection, causes said reader to perform specific shading operation involving cleaning said reader after stopping said print job but before restarting said print job,
   wherein a time period for performing one instance of said specific shading operation is shorter than a time period for performing one instance of a normal shading operation involving cleaning said reader, said normal shading operation being performed except when the abnormality is detected in said automatic inspection, and wherein the normal shading operation involves cleaning at least a portion of the reader a plurality of times and the specific shading operation involves cleaning the portion of the reader only once.

2. An inspection system comprising:

an abnormality detector that performs automatic inspection for detecting an abnormality on the basis of a read image obtained by causing a reader to read an image that is formed on a recording medium by executing a print job; and a hardware processor that, when the abnormality is detected in said automatic inspection, causes said reader to start shading operation involving cleaning said reader after stopping said print job but before restarting said print job, and, in a case where a level of the abnormality detected in an operation for stabilizing an amount of light in said started shading operation is lower than a level of the abnormality detected in said automatic inspection, causes said started shading operation to be performed as specific shading operation, wherein a time period for performing one instance of said specific shading operation is shorter than a time period for performing one instance of a normal shading operation involving cleaning said reader, said normal shading operation being performed except when the abnormality is detected in said automatic inspection, and wherein the normal shading operation involves cleaning at least a portion of the reader a plurality of times and the specific shading operation involves cleaning the portion of the reader only once.

3. An inspection system comprising:

an abnormality detector that performs automatic inspection for detecting an abnormality on the basis of a read image obtained by causing a reader to read an image that is formed on a recording medium by executing a print job;

an acceptor that accepts designation of either a first mode or a second mode, said first mode being a mode in which, when the abnormality is detected in said automatic inspection, specific shading operation involving cleaning said reader is performed after stopping said print job but before restarting said print job, said second mode being a mode in which, when the abnormality is detected in said automatic inspection, shading operation involving cleaning said reader is started after stopping said print job but before restarting said print job, and, in a case where a level of an abnormality detected in an operation for stabilizing an amount of light in said started shading operation is lower than a level of the abnormality detected in said automatic inspection, said started shading operation is performed as said specific shading operation; and a hardware processor that causes said reader to perform the specific shading operation according to said accepted designation, wherein a time period for performing one instance of said specific shading operation is shorter than a time period for performing one instance of a normal shading operation involving cleaning said reader, said normal shading operation being performed except when the abnormality is detected in said automatic inspection, and wherein the normal shading operation involves cleaning at least a portion of the reader a plurality of times and the specific shading operation involves cleaning the portion of the reader only once.

4. A non-transitory computer-readable storage medium storing an inspection program, the inspection program causing a computer to execute:

(a) performing automatic inspection for detecting an abnormality on the basis of a read image obtained by causing a reader to read an image that is formed on a recording medium by executing a print job; and (b) when the abnormality is detected in said automatic inspection, causing said reader to perform specific shading operation involving cleaning said reader after stopping said print job but before restarting said print job, wherein a time period for performing one instance of said specific shading operation is shorter than a time period for performing one instance of a normal shading operation involving cleaning said reader, said normal shading operation being performed except when the abnormality is detected in said automatic inspection, and wherein the normal shading operation involves cleaning at least a portion of the reader a plurality of times and the specific shading operation involves cleaning the portion of the reader only once.

5. A non-transitory computer-readable storage medium storing an inspection program, the inspection program causing a computer to execute:

(c) performing automatic inspection for detecting an abnormality on the basis of a read image obtained by causing a reader to read an image that is formed on a recording medium by executing a print job; and (d) when the abnormality is detected in said automatic inspection, causing said reader to start shading operation involving cleaning said reader after stopping said print job but before restarting said print job, and, in a case where a level of an abnormality detected in an operation for stabilizing an amount of light in said started shading operation is lower than a level of the abnormality detected in said automatic inspection, causing said started shading operation to be performed as specific shading operation, wherein a time period for performing one instance of said specific shading operation is shorter than a time period for performing one instance of a normal shading operation involving cleaning said reader, said normal shading operation being performed except when the abnormality is detected in said automatic inspection, and wherein the normal shading operation involves cleaning at least a portion of the reader a plurality of times and the specific shading operation involves cleaning the portion of the reader only once.

6. A non-transitory computer-readable storage medium storing an inspection program, the inspection program causing a computer to execute:

(e) performing automatic inspection for detecting an abnormality on the basis of a read image obtained by causing a reader to read an image that is formed on a recording medium by executing a print job;

(f) accepting designation of either a first mode or a second mode, said first mode being a mode in which, when the abnormality is detected in said automatic inspection, specific shading operation involving cleaning said reader is performed after stopping said print job but before restarting said print job, said second mode being a mode in which, when the abnormality is detected in said automatic inspection, shading operation involving cleaning said reader is started after stopping said print job but before restarting said print job, and, in a case where a level of the abnormality detected in an operation for stabilizing an amount of light in said started shading operation is lower than a level of the abnormality detected in said automatic inspection, said started shading operation is performed as said specific shading operation; and (g) causing said reader to perform specific shading operation according to said accepted designation, wherein a time period for performing one instance of said specific shading operation is shorter than a time period for performing one instance of a normal shading operation involving cleaning said reader, said normal shading operation being performed except when the abnormality is detected in said automatic inspection, and wherein the normal shading operation involves cleaning at least a portion of the reader a plurality of times and the specific shading operation involves cleaning the portion of the reader only once.

7. An inspection method executed by an inspection system, the method comprising:

(a) performing automatic inspection for detecting an abnormality on the basis of a read image obtained by causing a reader to read an image that is formed on a recording medium by executing a print job; and (b) when the abnormality is detected in said automatic inspection, causing said reader to perform specific shading operation involving cleaning said reader after stopping said print job but before restarting said print job, wherein a time period for performing one instance of said specific shading operation is shorter than a time period for performing one instance of a normal shading operation involving cleaning said reader, said normal shading operation being performed except when the abnormality is detected in said automatic inspection, and wherein the normal shading operation involves cleaning at least a portion of the reader a plurality of times and the specific shading operation involves cleaning the portion of the reader only once.

8. An inspection method executed by an inspection system, the method comprising:

(c) performing automatic inspection for detecting an abnormality on the basis of a read image obtained by causing a reader to read an image that is formed on a recording medium by executing a print job; and (d) when the abnormality is detected in said automatic inspection, (d) causing said reader to start shading operation involving cleaning said reader after stopping said print job but before restarting said print job, and, in a case where a level of an abnormality detected in an operation for stabilizing an amount of light in said started shading operation is lower than a level of the abnormality detected in said automatic inspection, causing said started shading operation to be performed as specific shading operation, wherein a time period for performing one instance of said specific shading operation is shorter than a time period for performing one instance of a normal shading operation involving cleaning said reader, said normal shading operation being performed except when the abnormality is detected in said automatic inspection, and wherein the normal shading operation involves cleaning at least a portion of the reader a plurality of times and the specific shading operation involves cleaning the portion of the reader only once.

9. An inspection method executed by an inspection system, the method comprising:

(e) performing automatic inspection for detecting an abnormality on the basis of a read image obtained by causing a reader to read an image that is formed on a recording medium by executing a print job;

(f) accepting designation of either a first mode or a second mode, said first mode being a mode in which, when the abnormality is detected in said automatic inspection, specific shading operation involving cleaning said reader is performed after stopping said print job but before restarting said print job, said second mode being a mode in which, when the abnormality is detected in said automatic inspection, shading operation involving cleaning said reader is started after stopping said print job but before restarting said print job, and, in a case where a level of the abnormality detected in an operation for stabilizing an amount of light in said started shading operation is lower than a level of the abnormality detected in said automatic inspection, said started shading operation is performed as said specific shading operation; and (g) causing said reader to perform specific shading operation according to said accepted designation, wherein a time period for performing one instance of said specific shading operation is shorter than a time period for performing one instance of a normal shading operation involving cleaning said reader, said normal shading operation being performed except when the abnormality is detected in said automatic inspection, and wherein the normal shading operation involves cleaning at least a portion of the reader a plurality of times and the specific shading operation involves cleaning the portion of the reader only once.

10. The inspection method of claim 9, wherein in the case where the level of the abnormality detected in the operation for stabilizing the amount of light in said started shading operation is lower than the level of the abnormality detected in said automatic inspection, said started shading operation is performed as said specific shading operation;

after said specific shading operation is completed, determining whether a level of dust is lower than a level detected in said automatic inspection;

in response to determining that the level of dust is not lower than the level detected in said automatic inspection, determining whether a maximum number of shading operations has been reached; and in response to determining that the maximum number of shading operations has not been reached, perform another instance of said specific shading operation.

* * * * *